Feb. 4, 1964 K. IRBITIS 3,120,274
PNEUMATIC PROPELLER DRIVES
Filed Dec. 1, 1960 2 Sheets-Sheet 1
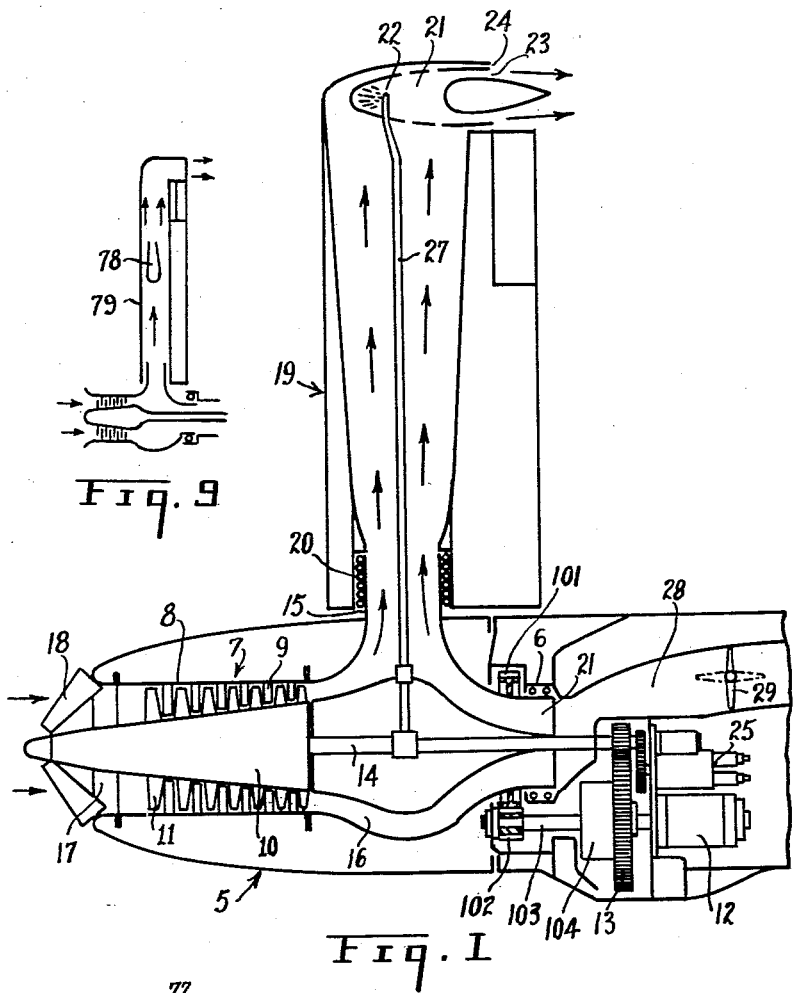
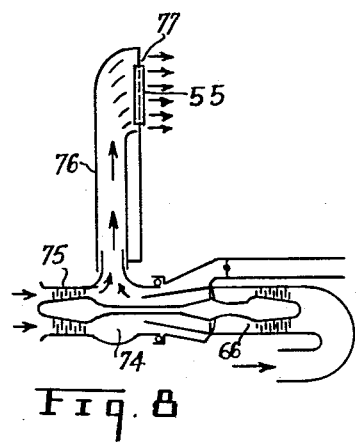
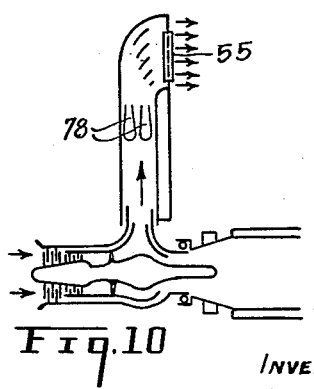
INVENTOR
KARL IRBITIS
By Hetherstonhaugh & Co.
ATTORNEYS

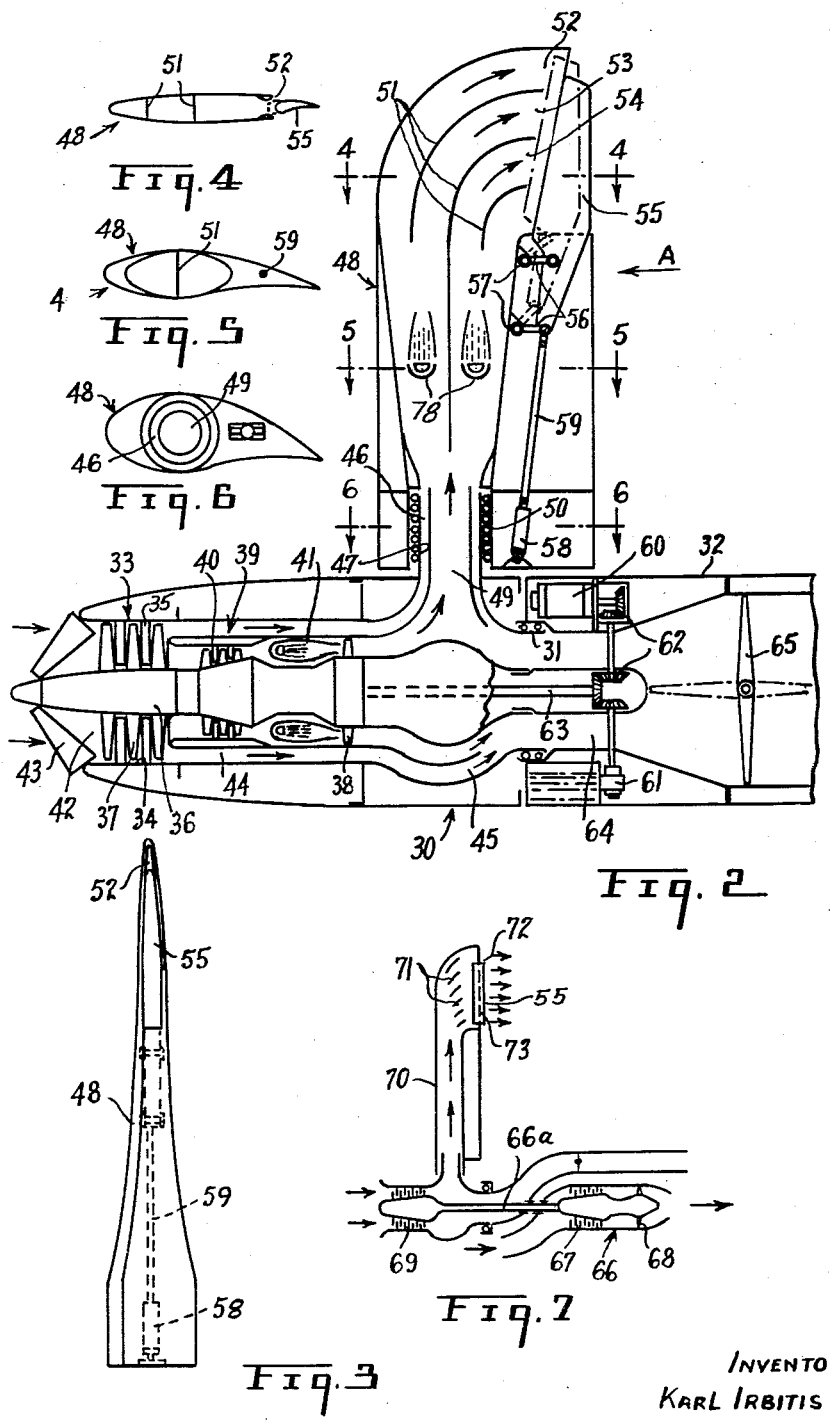

United States Patent Office 3,120,274
Patented Feb. 4, 1964

3,120,274
PNEUMATIC PROPELLER DRIVES
Karl Irbitis, Montreal, Quebec, Canada, assignor to Canadair Limited, Montreal, Quebec, Canada
Filed Dec. 1, 1960, Ser. No. 73,066
8 Claims. (Cl. 170—135.4)

This invention relates to pneumatic drives for thrust systems in aircraft such as helicopter rotors, propellers and ducted propellers, and more particularly to pneumatic drives carried by and rotating with the thrust systems.

The invention consists essentially in providing an integrated gas and thrust producer unit providing the shortest possible path for the working gas from the intake, through the gas producer to the blades of the thrust system where the gas is ejected through blade tip jet nozzles to effect rotation of the thrust system. The integrated gas and thrust producer system is characterized in that the gas producer (air) is mounted directly on and rotates with the hub, has its air intake centered on the axis of the hub and its output feeding directly into the hollow blades of the thrust system. The gas producer can be driven directly by the thrust system through blade tip fuel jets or by any other well known turbine combination directly connected to the gas producer in the rotating hub of the thrust system or on affixed mounting through suitable drive mechanism.

Since the beginning of aviation the most widely used power system has been the piston engine driven propeller. The development of the piston engine brought higher rotational speeds which necessitated a reduction gear between the engine and propeller.

With the advent of the helicopter the reduction gears and transmissions to rotors became one of the major engineering problems in helicopter development.

The present trend to gas turbines, with their high revolutions, requires more gears and other parts. Gear ratios up to 1:100 can be encountered where small, high speed, turbines are used.

To develop gear systems for reasonable reliability is a slow and costly process. The present day life span of 50 to 100 hours results in very high maintenance costs.

Bringing the life span to 200 hours would improve the situation considerably. It would not, however, reduce the complexity of the system.

In VTOL aircraft the complexity of the transmissions is further increased due to the requirement of thrust symmetry in hovering; irrespective of the number of working engines. This leads to interconnecting shafts and clutches which are normally running idle and very seldom loaded to their full capacity.

The transmission of power to propellers and rotors by means of gearless systems has been under consideration for some time in an effort to avoid the drawbacks of systems employing gears.

One obvious way to achieve this is by the employment of chain or belt drives. Advancement in V and toothed-belt drive has enabled this method to be adopted in some recent helicopter designs. However such systems prove to be heavy and bulky for higher power application and do not lend themselves to angular and reversed drives.

In principle, the non-mechanic drives—electric, hydraulic and pneumatic—are the most versatile methods of transmission, although the first two require considerable development in order to obtain a weight and an efficiency comparable to the gear drives.

The third—the pneumatic power transmission system—has more promise, because the air mass, handled by the prime-mover-gas turbine can be utilized as a power transmission and working medium. The flow of compressed gas from the gas turbine (mainly air mixed with producuts of combustion), can be transported to the thrust systems direct.

The thrust systems are: propellers, ducted propellers and helicopter rotors.

Near, or inside of, these thrust systems the compressed gas flow can be transformed into mechanical energy thus providing the necessary driving power.

The primary object of the invention is to provide an integrated gas and thrust producer unit for aircraft.

A further object of the invention is to provide an integrated gas and thrust producer unit combining blade tip jets by means of which the gas producer is rotated.

A further object of the invention is to provide an integrated gas and thrust producer unit which can incorporate a turbojet engine for rotation of the gas producer.

A further object of the invention is to provide means for modulating the tip jet nozzle area of the thrust system automatically.

A further object of the invention is to provide means to close off the intake of the gas producer on failure of the thrust system.

These and other objects of the invention will be apparent from the following detailed description and the accompanying drawings in which:

FIG. 1 is a schematic sectional view showing an integrated gas and thrust producer applied to an aircraft propeller and incorporating a blade tip fuel jet.

FIG. 2 is a schematic sectional view similar to FIG. 1 but showing the integrated gas and thrust producer incorporating a by-pass engine feeding air and the products of combustion to the blade tip nozzle and also incorporating automatic means to vary the area of the blade tip nozzle.

FIG. 3 is a vertical elevation of the propeller blade shown in FIG. 2 looking in the direction of the arrow A.

FIG. 4 is a horizontal cross-section of the blade on the line 4—4 of FIG. 2.

FIG. 5 is a horizontal cross-section of the blade on the line 5—5 of FIG. 2.

FIG. 6 is a horizontal cross-section of the blade on the line 6—6 of FIG. 2.

FIG. 7 is a diagrammatic showing of a modified form of integrated gas and thrust producer unit including a gas producer driven by a stationary mounted turbojet engine.

FIG. 8 is a diagram similar to FIG. 7 but showing an installation in which the turbojet engine feeds its exhaust gases into the thrust producer.

FIG. 9 is a diagram similar to FIG. 1 but incorporating a combustor radially disposed within the propeller blade.

FIG. 10 is a diagram similar to FIG. 2 and incorporating reheat units within the blade.

The integrated gas and thrust producer unit hereinafter described comprises a thrust system which may be a helicopter rotor, propeller or ducted propeller. The blades of the thrust system have internal gas passages leading from the hub of the unit to discharge nozzles at the tip of the rotor or propeller blades. Where a compressor and starter form the gas producer, blade tip fuel jets are provided to rotate the compressor after the system has started to function. Means to modulate the efflux of gas from the blade tip nozzles may be incorporated to function automatically in accordance with the speed of rotation of the system. The gas producer forming an integral part of the thrust system and hereinafter referred to as a compressor is mounted in the hub of the thrust system and its housing and stator blades rotate at the same speed as the thrust system while its rotor and rotor blades is driven by a starter unit for starting up only, when the system includes blade tip fuel jets, and/or a turbojet engine which is continuously operated to rotate the rotor of the compressor when blade tip jets are not fitted. The turbojet engine may take any of the well known forms and may be installed in the hub as an integral part of the thrust system or it may be installed on the stationary structure of the aircraft and drive the compressor by a connecting shaft.

While a thrust system has been illustrated showing propeller blades, it is to be clearly understood that the blades could be the blades of a helicopter rotor or the blades of a ducted propeller.

In the simplified form of the invention shown in FIG. 1 of the drawings, the integrated gas and thrust producer comprises a hub assembly 5 supported on the bearings 6 which takes all the thrust bending and inertia loads. A compressor 7 is mounted within the hub 5 and its housing or stator 8 and stator blades 9 rotate with and at the same speed as the hub assembly whereas the rotor 10 and rotor blades 11 of the compressor can be driven either by the starter 12 through the gearing 13 and drive shaft 14 for starting up purposes or from the propeller hub through the gear 101, pinion 102, shaft 103 and clutch 104 to the gearing 13. The starter 12, gearing 13 and clutch 104 are preferably mounted on the fixed structure of the aircraft. Also included in the hub assembly 5 are the hollow blade mounting stub sleeves 15 of which only one is shown for illustrative purposes. These hollow stub sleeves 15 are connected with the delivery end of the compressor 7 through the hub chamber 16. The inlet 17 of the compressor may be fitted with a non-return valve 18.

The thrust system consists of the hollow blades 19 which are journalled on the hollow stub sleeves 15 through the bearings 20. In the drawings, the blades are shown in the feathered position for illustrative purposes only. A combustor 21 including a fuel nozzle 22 is mounted at the outer end of each blade 19 and its discharge outlet 23 is directed into the gas discharge nozzle 24 at the top of the trailing edge of the blade. The fuel from the fuel pump 25 to the nozzle 22, together with means to ignite the fuel are carried through the hollow blades by the pipe 27.

The hub chamber 16 may be provided with a rear outlet passage 28 whereby the compressed gas from the compressor 7 can be diverted from the blades 19 to feed other similar parallel systems. A valve 29 in the outlet passage 28 is kept in the open position while the parallel systems are in operation. By using one system only, the valve 29 will be normally closed and will be opened only at starting to relieve back pressure.

In the operation of the form of the invention illustrated in FIG. 1, the non-return valve 18 is in position to allow a free flow of air into the compressor. With the valve 29 in the closed position, the starter 12 is activated to rotate the rotor 10 of the compressor 7, starting a flow of compressed air to the hollow blades 19. At the same time the fuel pump 25 feeds fuel through the pipe 27 to the combustor fuel nozzle 22. With the blades 19 in the non-feathered position and the fuel at the nozzle 22 ignited, and the products of combustion combining with the compressed air being ejected through the nozzle 24, the resulting thrust will rotate the blades and the hub assembly about the axis of the hub. The gear 101, attached to the rear of the rotating hub assembly 5, drives the pinion 102 which through the shaft 103 and clutch 104, drives the spur gear 13 and in such a way takes over the task of driving the compressor 7 from the starter which can be shut off or which disengages and stops automatically, in such a way, the pneumatic drive of the thrust mechanism will be maintained. Metering the fuel quantities to the tip nozzles 22 will control the power output of the system within certain acceptable temperature and rotational speed limits. The rear outlet passage 28 serves the purpose of diverting some of the compressed air from the compressor 7 to feed it, if necessary, to other parallel thrust systems.

In the modified form of the invention illustrated in FIG. 2, the compressor is operated by a by-pass engine mounted in the rotating hub of the thrust mechanism and the combined compressed air from the compressor and the hot gases from the by-pass engine are fed to the hollow propeller blades.

In FIG. 2 the hub assembly 30 is supported by the bearings 31 on the stationary structure 32 of the aircraft, and incorporates a main compressor 33 whose housing 34 and stator blades 35 rotate with and at the same speed on the hub assembly 30, and its rotor 36 and rotor blades 37 are driven by the turbine 38 of the by-pass engine 39. The by-pass engine 39 includes an engine compressor 40 and combustor 41.

In this form of the invention the air is drawn in through the inlet 42 which is provided with the non-return valve 43 and part of the compressed air is fed through the annular passage 44 to the hub chamber 45 and thence through the annular passages 46 in the stub sleeves 47 on which the hollow blades 48 are journalled. The remainder of the compressed air from the compressor 33 is passed through the engine compressor 40 to combine with the hot gases from the combustor 41 to drive the turbine 38. The exhaust gases are then passed through the axial passages 49 in the stub sleeves 47 and thence into the hollow blades 48. The cooler air passing through the annular passage 46 protects the blade mounting from the hot gases passing through the passage 49.

The blades 48 are journalled on the outer surfaces of the stub sleeves 47 through the bearings 50. The hollow interior of the blades 48 are divided by means of the barriers 51 to divert the combined compressed air and hot exhaust gases into separate streams directed towards the separate blade exit nozzles 52, 53 and 54. These exit nozzles 52, 53 and 54 are partially blocked by the automatic adjusting plug 55 which is supported on one end of the links 56 which in turn are pivoted on the blade structure at 57. The automatic nozzle area adjusting plugs 55 are operated by an actuator 58 and connecting rod 59 to vary the area of the opening of the nozzles 52, 53 and 54 with change of speed of rotation of the blades 48 or change in gas pressure, or both. The actuator 58 may be spring or hydraulic and will extend or contract according to the value of centrifugal force acting on the adjusting plugs 55 or pressure in the duct system.

Accessories such as the starter 60, oil pump 61 are mounted on the stationary structure 32 and are connected with the by-pass engine 39 by the gearing 62 and shaft 63.

A rear outlet 64 permits the exhaust of compressed air from the compressor 33 and hot gases from the by-pass engine 39 when the valve 65 is opened for the purpose of interconnecting of several turbo tip jet propellers with a duct.

In the modification shown diagrammatically in FIG. 7, the thrust mechanism is similar to that disclosed in FIG. 1, except that the combustor 21 at the top of the blades is eliminated and is replaced by the engine 66 which includes a compressor 67 and turbine 68 driving the rotor of the hub mounted compressor 69. The engine 66 is mounted on the stationary structure of the aircraft and drives the compressor 69 by means of the shaft 66a. The hollow blades 70 are provided with a series of deflectors 71 forming separate ejector nozzles 72 at the top of the blades. In this form of the invention the blades may be fitted with automatic adjusting plug devices 73 similar to the plugs 55 in FIG. 2, or simple laval type nozzles.

In the modification shown in FIG. 8, the arrangement is similar to FIG. 7 except that, where in FIG. 7 the exhaust from the engine 66 is ejected directly to the atmosphere, in FIG. 8 the exhaust is directed into the hub 74 of the rotating thrust mechanism where it combines with the compressed air from the compressor 75 before being directed into the hollow blades 76 and thence to the blade tip nozzles 77.

The modification shown in FIG. 9 is similar to FIG. 7 or 8 except that a reheat device 78 is installed within the hollow blade 79.

In all of the above described forms of thrust mechanism, the basic thrust element is compressed air derived from a compressor mounted on the rotatable hub of the thrust mechanism, in which the stator and stator blades of the compressor rotate with and at the same speed as the thrust mechanism. Various means are shown by way of example of starting the rotation of the thrust mechanism and for maintaining rotation of the rotor of the compressor to ensure a constant supply of compressed air to the balde tip nozzles. The feed of compressed air to the blade tip nozzles can be supplemented by either using combustors at the blade tip nozzles or by diverting the hot gases of the exhaust from jet engines, driving the rotor of the air compressor, into the path of the compressed air for added thrust effect at the tips of the blade.

Control of the propeller is obtained by the pitch setting of the blades about their axis. Control of the gas producer and tip jet nozzles will be by the methods normally used in gas turbines.

The structure illustrated in FIGS. 1 and 2 could be applied to tilt wing aircraft where the wide blades shown could readily be designed as free floating, servo tab controlled units or operated mechanically in the well known manner.

Reheat systems can be introduced into any part of the thrust system where reheating of either the compressed air or hot gases, or combinations of compressed air and hot gases were considered beneficial, such as is shown in FIGS. 9 and 10 where the compressed air and hot gases are reheated prior to their ejection through the blade tip nozzles.

What I claim is:

1. A thrust system for aircraft comprising a fixed aircraft structure and a rotatable propeller hub structure mounted on said fixed structure, a series of hollow blades mounted on said hub structure and rotatable thereon about their axis for blade pitch adjustment, said blades having tip jet nozzles, an air compressor axially mounted on said hub structure, the said air compressor having stator and rotor blade elements, the said stator blade elements rotating with and at the same speed as said hub structure, a turbo jet engine mounted in said hub structure and drivably connected to said rotor blade elements of said air compressor, means to pass the compressed air from said air compressor and the products of combustion from said turbojet engine through said hollow blades and to said tip jet nozzles to induce a thrust thereat effecting rotation of said hub structure, and means to modulate the efflux of gases from said tip jet nozzles, said latter means comprising a nozzle plug movable radially with respect to each of said blades to vary the outlet area of said nozzles operable by centrifugal forces acting on the said plug.

2. A thrust system drive for aircraft comprising a fixed aircraft structure and a rotatable propeller hub structure mounted on said fixed structure, a series of hollow blades mounted on said hub structure and rotatable thereon about their axes for blade pitch adjustment, said blades having tip jet nozzles, gas compressing means mounted in said hub structure, combustor means mounted within said hollow blades, means to pass the compressed gas from said gas compressing means to said hollow blades and about said combustor means and thence to said tip jet nozzles for development of a thrust reaction at said nozzles effecting rotation of said propeller hub structure, and automatic means movable with respect to each of said blades to modulate the exit of gas from said tip jet nozzles, said automatic means including plug means, associated with each of said tip jet nozzles and adapted to move towards and away from said nozzles to respectively decrease or increase the outlet areas of said nozzles.

3. A thrust system drive as set forth in claim 2, in which the said gas compressing means is an air compressor whose stator and stator blades rotate with and at the same speed as said rotatable hub structure.

4. A thrust system drive as set forth in claim 2, in which means are provided to bleed the gas from a point in said propeller hub structure between said gas compressing means and said hollow blades, into said fixed structure.

5. A thrust system drive as set forth in claim 4, in which a valve controls the bleed off of the gas.

6. A thrust system drive as set forth in claim 2, in which said plug means is automatically actuated by centrifugal force to increase or decrease the outlet areas of said tip jet nozzles.

7. A thrust system drive as set forth in claim 2, in which said plug means is movably mounted on said hollow blades by parallel link members, such that said plug means will move towards and away from said tip jet nozzles to respectfully decrease or increase the outlet areas of said nozzles.

8. A thrust system drive as set forth in claim 2, in which a starter provides initial drive for said gas compressing means until the power delivered to said tip jets is sufficient to drive said propeller hub structure and said air compressor.

References Cited in the file of this patent

UNITED STATES PATENTS

| | | |
|---|---|---|
| 1,807,359 | Waters | May 26, 1931 |
| 2,508,673 | Guthier | May 23, 1950 |
| 2,526,941 | Fishbein | Oct. 24, 1950 |
| 2,650,666 | Dorand et al. | Sept. 1, 1953 |
| 2,667,226 | Doblhoff | Jan. 26, 1954 |
| 2,674,421 | Cenzo | Apr. 6, 1954 |
| 2,689,615 | Fletcher | Sept. 21, 1954 |
| 2,814,349 | Berry | Nov. 26, 1957 |
| 3,015,363 | Knecht | Jan. 2, 1962 |

FOREIGN PATENTS

| | | |
|---|---|---|
| 964,204 | Germany | May 16, 1957 |
| 756,050 | Great Britain | Aug. 29, 1956 |
| 492,286 | Italy | Mar. 22, 1954 |

OTHER REFERENCES

American Helicopter, "Theory and Practice of Gas Turbine Power Plants for Helicopters," May 1953, pp. 6–14, pp. 10–11 referred to.